United States Patent [19]

Tabuchi

[11] Patent Number: 5,233,588
[45] Date of Patent: Aug. 3, 1993

[54] DISK REPRODUCTION APPARATUS AND METHOD FOR SEARCHING THEREOF

[75] Inventor: Yoichi Tabuchi, Higashihiroshima, Japan

[73] Assignee: Sharp Kabushiki Kaisha, Osaka, Japan

[21] Appl. No.: 763,223

[22] Filed: Sep. 20, 1991

[30] Foreign Application Priority Data

Oct. 9, 1990 [JP] Japan .................................. 2-271188

[51] Int. Cl.[5] .............................................. G11B 5/09
[52] U.S. Cl. ........................................ 369/47; 369/50; 369/54
[58] Field of Search .................. 369/32, 47, 50, 44.28, 369/54; 360/78.04

[56] References Cited

FOREIGN PATENT DOCUMENTS

| 092165 | 10/1983 | European Pat. Off. . |
|---|---|---|
| 58-218077 | 12/1983 | Japan . |
| 60-022791 | 2/1985 | Japan . |
| 63-112869 | 5/1988 | Japan . |
| 64-46270 | 2/1989 | Japan . |
| 2-27578 | 1/1990 | Japan . |

OTHER PUBLICATIONS

Patent Abstracts of Japan vol. 12, No. 34 (P-662) Feb. 12, 1988 & JP-A-62 185 289 (Alpine Electron Inc) Aug. 13 1987 7 English translation.
U.S. Ser. No. 07/604/897 filed Oct. 1990 to Tabuchi.

Primary Examiner—Aristotelis Psitos
Assistant Examiner—P. W. Huber
Attorney, Agent, or Firm—Nixon & Vanderhye

[57] ABSTRACT

A disk reproduction apparatus having pause time setting device for setting a determined pause time upon receiving an instruction for successive reproduction; automatic pause setting device for setting the apparatus in pause during the pause time and releasing the apparatus from the pause after the pause time has passed; and search device for searching the next music program to be reproduced by moving an optical pickup, wherein the pause time is set to coincide with a time interval between an end of a current music program and a beginning of the next music program to be reproduced, independently of any recorded positions of the music program without making a configuration of the apparatus complex. Thus, when performing a random reproduction of the music programs, listeners can enjoy a natural flow of the successively reproduced music programs like when reproduction is performed of the music programs in order from an inner portion toward an outer portion. Further, listeners can enjoy a disk in many ways as if music programs of other disks were being reproduced.

2 Claims, 9 Drawing Sheets

DISK REPRODUCTION APPARATUS AND METHOD FOR SEARCHING THEREOF

FIELD OF THE INVENTION

The present invention relates to a disk reproduction apparatus for successive reproduction of a plurality of music programs and a method for searching thereof. More particularly, the present invention relates to a disk reproduction apparatus and a method for searching thereof wherein time interval is made substantially constant between an end of a current music program and a beginning of the next music program to be reproduced.

BACKGROUND OF THE INVENTION

Conventionally, a reproduction method called random reproduction has been widely used in the field. With this reproduction method, on completing reproducing operation of a current music program using a CD (Compact Disc) player, the next music program to be reproduced is randomly selected from all music programs except those already being reproduced. After searching the next music program, reproducing operation of the next music program starts.

Figure 9:
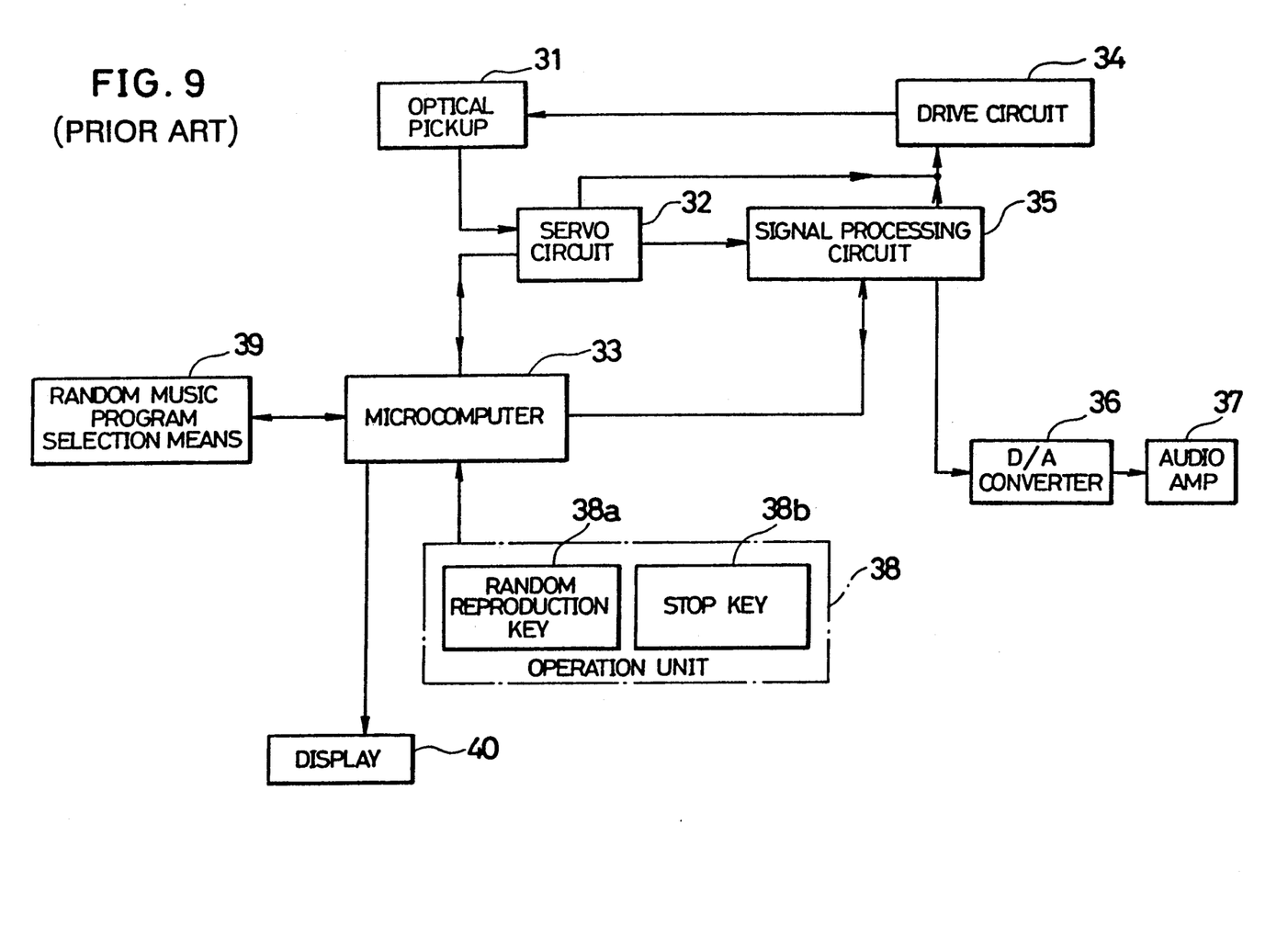
FIG. 9 is a block diagram showing an essential part of a configuration of the conventional disk reproduction apparatus.

Referring to FIG. 9, a configuration of a generally used CD player will be described hereinbelow.

The CD player comprises: an optical pickup 31 for reading out information from a disk (not shown); a servo circuit 32 for respectively controlling a focus servo for converging a laser beam, for reading out the information, on the disk, a tracking servo for improving an act of following of a laser beam from the optical pickup 31 in order to read out the information, a spin servo for rotating the disk, a slide servo for moving the optical pickup 31 over the disk from an inner portion toward an outer portion or from the outer portion toward the inner portion; a microcomputer 33 for controlling the servo circuit 32, a signal processing circuit 35 (to be described later) and output of display use data to a display 40 based on input from an operation unit 38 (to be described later) and for performing other controls; the signal processing circuit 35 which modulates output signals from the optical pickup 31 in the form of EFM (Eight to Fourteen Modulation) and demodulates in the form of error-correcting subcode; a D/A converter 36 for converting digital output signals from the signal processing circuit 35 into analog signals; an audio AMP 37 for amplifying output from the D/A converter 36; a drive circuit 34 for performing focus control, tracking control, slide motor control and spin motor control of the optical pickup 31 based on input signals from the servo circuit 32 or the signal processing circuit 35; random music program selection means 39 for randomly selecting the next music program to be reproduced; and the display 40 for showing the display use data. In addition, the operation unit 38 includes a random reproduction key 38a for instructing the random reproduction and a stop key 38b for terminating the random reproduction.

Figure 7:
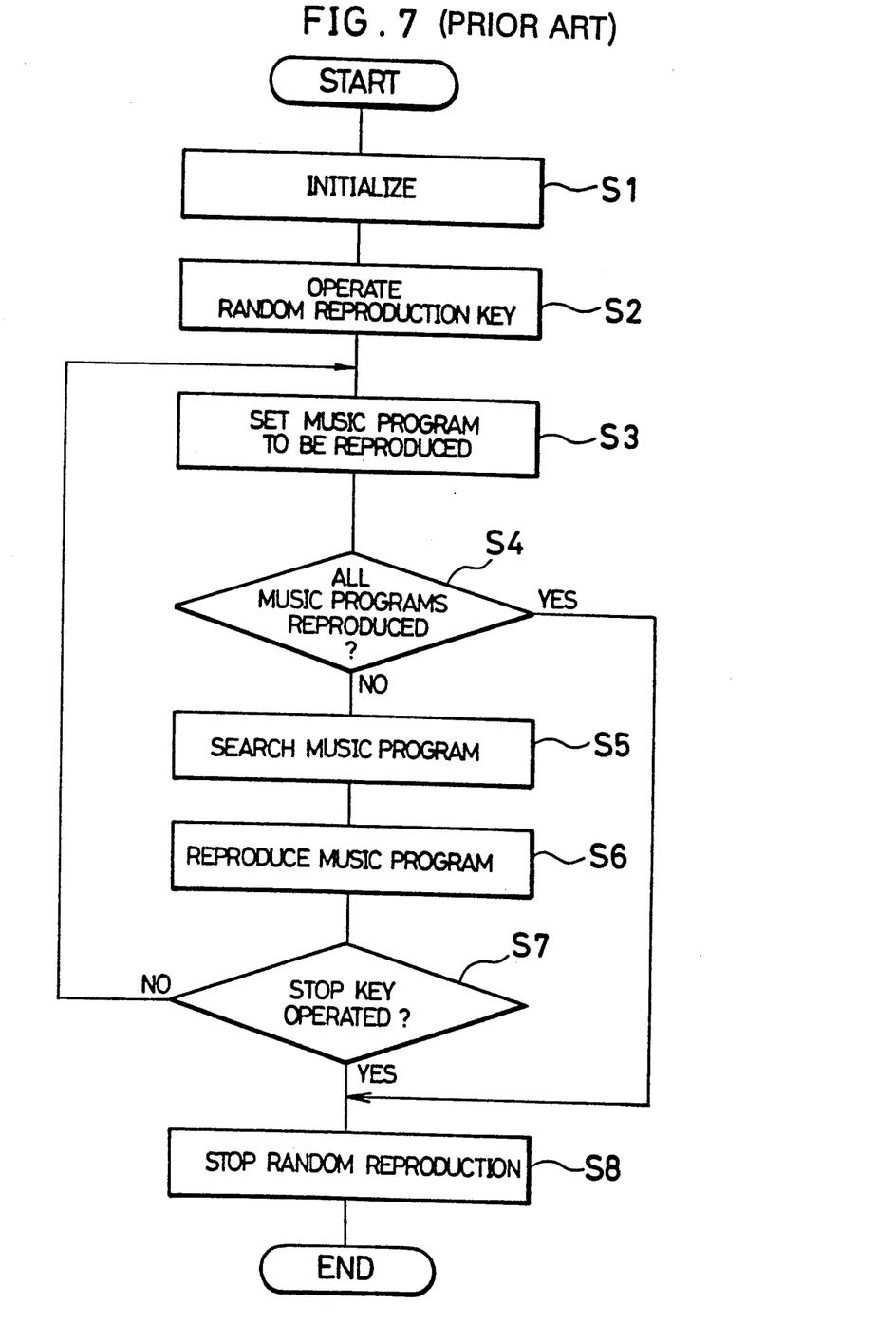
FIG. 7 is a flow chart showing a process of random reproduction in accordance with a conventional disk reproduction apparatus.

The conventional random reproduction method, which has been widely used, will be described hereinbelow referring to a flow chart in FIG. 7.

A system is first to be initialized. Then, after loading a disk, reading out of TOC (Table of Contents) information recorded on the disk starts (S1). The TOC information is stored on an inner portion of the disk and it contains information regarding at least starting and ending positions of the respective music programs recorded on the disk.

The random reproduction key 38a (see FIG. 9) for instructing the random reproduction of the music programs is next to be operated (S2). This S2 is a step for starting up the random reproduction. Then, the random music program selection means 39 (see FIG. 9) selects the next music program to be reproduced (S3). Here, the system is designed such that each music program is to be reproduced only once.

Then it is judged whether the reproduction of all the music programs has been completed. If there are no music programs left to be reproduced, the sequence moves to S8 (to be described later) to terminate the random reproduction. On the other hand, if there are any music programs left to be reproduced, the sequence goes on to S5 (S4).

In S5, a searching operation is performed of the next music program to be reproduced. Here, the time required for searching varies depending on a distance between a present position of the pickup and a starting position of the next music program to be reproduced, in short, the greater the distance, the longer the search time.

After the searching operation in S5 has been completed, the reproduction of the searched music program starts (S6). Then, on completing the reproduction of the music program, it is checked whether the stop key is operated (S7). If the stop key is operated in S7, the sequence moves to S8 to terminate the random reproduction. If not, on the other hand, the sequence goes back to S3 to repeat the above-mentioned process so as to continue the reproducing operation.

Figure 8:
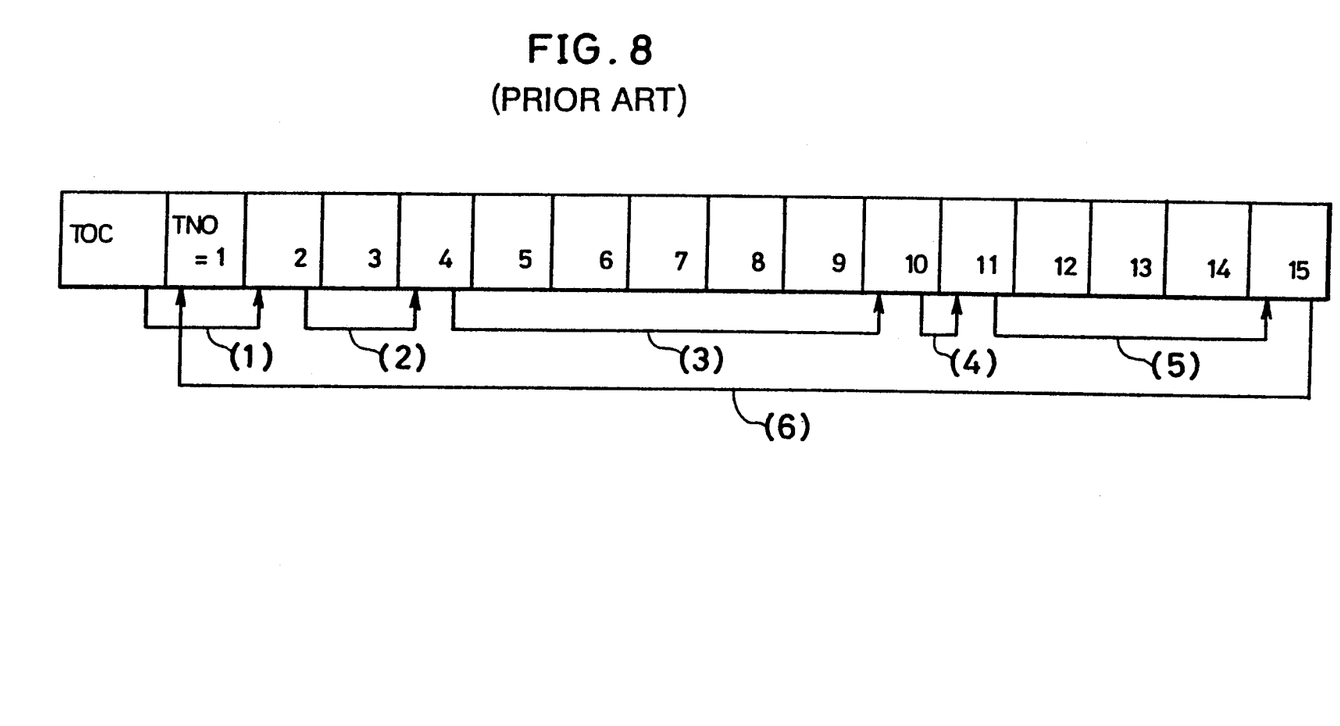
FIG. 8 is an explanatory drawing illustrating the case where random reproduction of some music programs is performed out of 15 music programs recorded on the disk with the conventional method.

Now assuming that fifteen (15) music programs are recorded on the disk (recorded in areas indicated by TNO=1 to TNO=15 on the disk in FIG. 8), the following will discuss a search method when the random reproduction is performed using the generally used CD player referring to FIG. 8.

As shown in FIG. 8, in the figure, a search time indicated by an arrow (1) (the search of a music program recorded in TNO=2 from TOC area) is, for example, 0.7 second. Similarly, a search time indicated by an arrow (2) (the search of a music program recorded in TNO=4 from TNO 2) is, for example, 0.7 second. Respective time required for search (3), search (4), search (5) and search (6) are 1.5 seconds, 0.5 second, 1.1 seconds and 3.3 seconds. Here, the time required for the search (4) is the shortest (0.5 second) and that for the search (6) is the longest (3.3 seconds) among all. As can be seen from this example, the time required for searching is not constant.

Thus, as described above, when performing the random reproduction with the conventional method, a time interval is not constant between an end of a current music program and a beginning of the next music program to be reproduced. Therefore, a waiting time for the next music program is not likely to be constant. For this reason, listeners may not feel comfortable.

Further, this conventional method presents a problem that it is not applicable to the case where information recorded on a disk is to be reproduced at a constant interval (for example, the Hundred Poems by the Hundred Poets for a Japanese card game).

SUMMARY OF THE INVENTION

An object of the present invention is to provide a disk reproduction apparatus performing a reproducing operation at a constant interval, independently of any recorded positions of music programs without making a configuration of the disk reproduction apparatus complex.

In order to achieve the aforementioned object, the disk reproduction apparatus in accordance with the present invention for successive reproduction of a plurality of music programs recorded on a disk using an optical pickup, comprises: pause time setting means for setting a determined pause time upon receiving an instruction for the successive reproduction; automatic pause setting means for keeping the apparatus in pause during the pause time and releasing the apparatus from the pause after the pause time has passed; and search means for searching the next music program to be reproduced during the pause time by moving the optical pickup. Here, as for the pause time setting means and the automatic pause setting means, a microcomputer, for example, can be used.

With the above-mentioned configuration, upon receiving an instruction for successive reproduction, a determined pause time is set by the pause time setting means. Thereafter, the search means starts searching operation of the next music program to be reproduced. Then, after the set pause time has passed, the automatic pause setting means releases the apparatus from the pause so that the reproducing operation of the selected music program starts.

This permits a time interval between an end of a current music program and a beginning of the next music program to be reproduced to coincide with the pause time, independently of any recorded positions of the music programs without making a configuration of the apparatus complex. Thus, since a waiting time for the next music program becomes constant, listeners for the disk reproduction apparatus can enjoy a natural flow of the successively reproduced music programs. Moreover, the listeners can enjoy a disk in many ways as if music programs of other disks were being reproduced.

In order to achieve the above-mentioned object, another disk reproduction apparatus in accordance with the present invention, comprises: a drive circuit for moving an optical pickup in response to drive voltage to be applied thereto (hereinafter referred to as drive voltage) and its time duration; and control means (for example, a microcomputer) for making a time interval constant between an end of a current music program and a beginning of the next music program to be reproduced by controlling a level of the drive voltage and/or its time duration.

According to this arrangement, the level of the drive voltage and its time duration are controlled by the control means. As a result, the time interval can be made substantially constant between the end of the current music program and the beginning of the next music program to be reproduced. Further, when a searching operation is performed, for example, by adjusting the number of tracks which the optical pickup jumps at a time (hereinafter referred to as track jump, the time required for searching can be significantly reduced.

In order to achieve the aforementioned object, a search method of the disk reproduction apparatus in accordance with the present invention, is characterized in that when successive reproduction of music programs is to be performed, search time for each music program can be made substantially constant.

With this search method, when the successive reproduction is to be performed, the time required for searching each music program is made substantially constant. As a result, listeners for the disk reproduction apparatus can enjoy a natural flow of the successively reproduced music programs.

For a fuller understanding of the nature and advantages of the invention, reference should be made to the ensuing detailed description taken in conjunction with the accompanying drawings.

BRIEF DESCRIPTION OF THE DRAWINGS

FIG. 1 through FIG. 6 show one embodiment of the present invention.

FIG. 3 is an explanatory drawing illustrating a searching operation of music programs recorded on a disk.

FIG. 3 (a) is an explanatory drawing illustrating the case where a reproducing operation is preformed by randomly selecting a music program out of fifteen music programs recorded on the disk.

FIG. 3 (b) is an explanatory drawing illustrating a searching operation in the case where a pause time is set.

FIG. 3 (c) is an explanatory drawing illustrating a searching operation in the case where drive voltage to be applied to a slide motor and its time duration are varied.

FIG. 7 through FIG. 9 show the prior art.

DESCRIPTION OF THE EMBODIMENTS

Referring to FIGS. 1 through 6, the following description will discuss one embodiment of the present invention.

With a disk reproduction apparatus in accordance with the present invention, when copying music programs recorded on a disk to a cassette of other apparatuses of such as DATs (Digital Audio Tape-recorder), reproduced music programs can be used as BGM (Back Ground Music) by performing successive reproduction at random. It is also applicable to the case of, for example, playing a Japanese card game called the Hundred Poems by the Hundred Poets since each poem recorded on the disk can be randomly reproduced at a constant interval according to the present apparatus.

Figure 2:
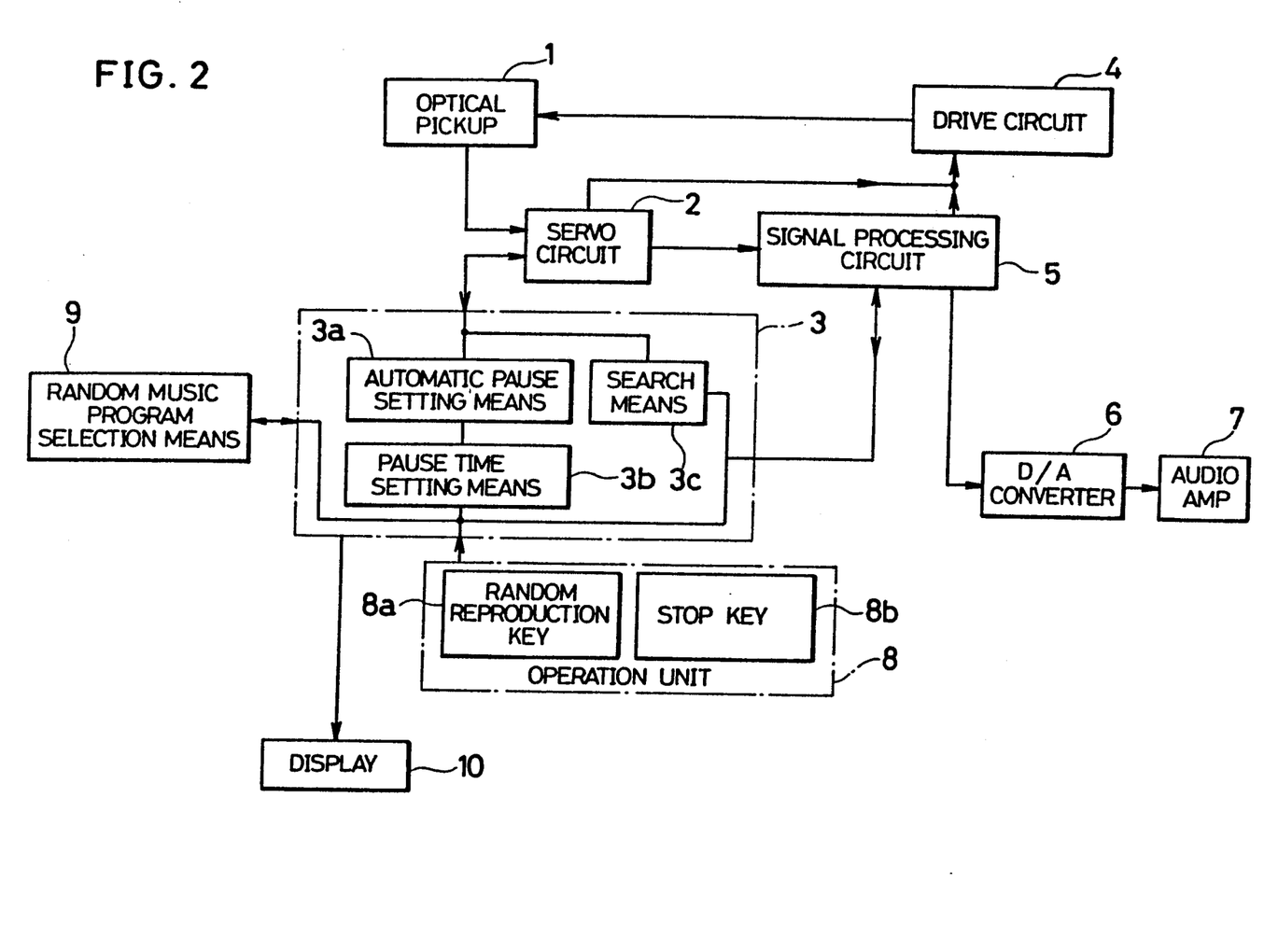
FIG. 2 is a block diagram showing an essential part of a configuration of a disk reproduction apparatus in accordance with the present invention.

As shown in FIG. 2, the disk reproduction apparatus in accordance with the present invention, comprises: an optical pickup 1 for reading out information from a disk (not shown); a servo circuit 2 for respectively controlling a focus servo for converging a laser beam, for reading out the information, on the disk, a tracking servo for improving an act of following of a laser beam from the optical pickup 1 in order to read out the information, a spin servo for rotating the disk, a slide servo for moving the optical pickup 1 over the disk from an inner portion toward an outer portion or from the outer portion toward the inner portion; a microcomputer 3 for controlling the servo circuit 2, a signal processing circuit 5 (to be described later) and output of display use data to a display 10 based on input from an operation unit 8 (to be described later) and for performing other controls; the signal processing circuit 5 which modulates output signals from the optical pickup 1 in the form of EFM (Eight to Fourteen Modulation) and demodulates in the form of error-correcting subcode; a D/A converter 6 for converting digital output signals from the signal processing circuit 5 into analog signals; an audio AMP 7 for amplifying output from the D/A converter 6; a drive circuit 4 (drive means) for performing focus control, tracking control, slide motor control and spin motor control of the optical pickup 1 based on input signals from the servo circuit 2 or from the signal processing circuit 5; random music program selection means 9 (selection means) for randomly selecting the next music program to be reproduced; and the display 10 for showing the display use data. In addition, the operation unit 8 includes a random reproduction key 8a for instructing the random reproduction and a stop key 8b for terminating the random reproduction.

Further, the microcomputer 3 includes automatic pause setting means 3a, pause time setting means 3b and search means 3c.

The pause time setting means 3b automatically sets a determined pause time when the random reproduction key is operated. During the pause time, the disk reproduction apparatus is set such that the reproducing operation is not performed (pause state). In addition, the pause time is predetermined or may be calculated based on TOC information so as to coincide with the longest search time among all. Here, it should be noted that this pause time varies depending on a type of disk reproduction apparatus being employed.

After the pause time is set, the automatic pause setting means 3a sets the disk reproduction apparatus in pause. This pause state will be kept during the pause time, and on passing the pause time, the automatic pause setting means releases the apparatus from the pause. Then, the disk reproduction apparatus becomes able to perform the reproducing operation again.

The search means 3c searches the next music program to be reproduced by moving the optical pickup 1 to the starting position of the next music program to be reproduced.

More concretely, when the random reproduction key 8a is operated, the pause time setting means sets a determined pause time. During the pause time, the automatic pause setting means 3a keeps the disk reproduction apparatus in pause. Thereafter, the search means 3c starts searching operation of the next music program to be reproduced by means of the optical pickup 1.

Here, when the search time is shorter than the pause time, the reproducing operation will be prolonged until the pause time has passed (i.e., until time obtained by subtracting a search time from a pause time has passed). As a result, when the pause time has passed, the automatic pause setting means 3a releases the disk reproduction apparatus from the pause. Then, the reproducing operation of the next music program starts.

Even when the search time became longer than the pause time, the reproducing operation of the next music program would start immediately after the search so that the time interval between the end of the current music program and the beginning of the next music program to be reproduced becomes substantially constant.

Figure 3A:
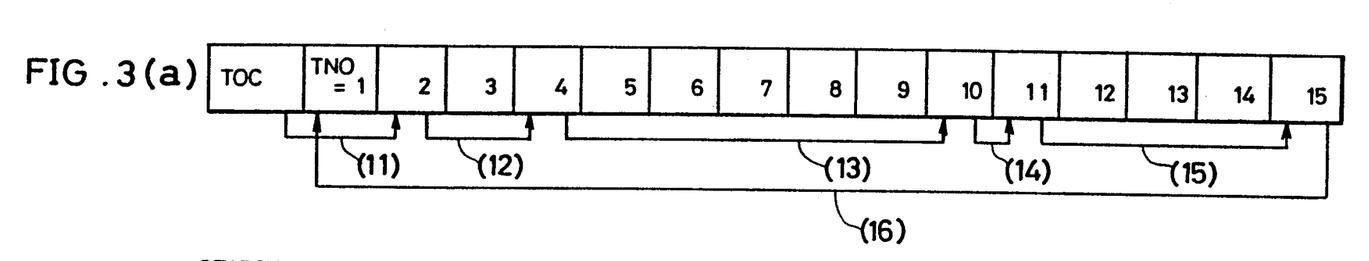
Figures 3B, 3C:
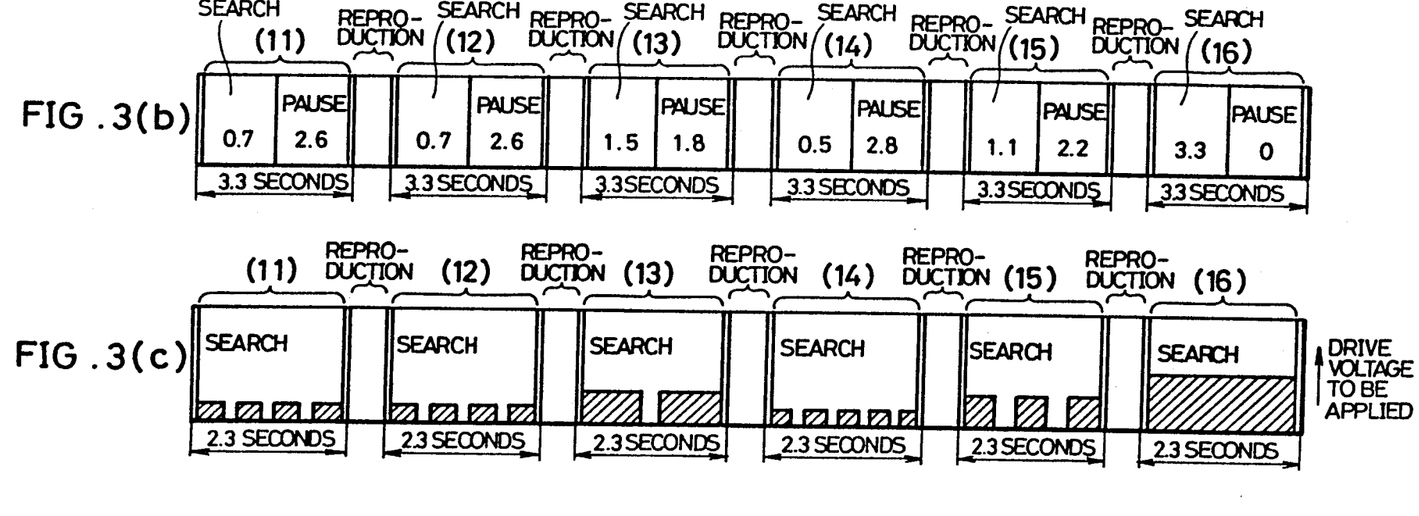

Referring to FIGS. 3 (a) and (b), the following description will discuss the random reproduction.

As shown in FIG. 3(a), it is assumed that fifteen (15) music programs are recorded on the disk (recorded in areas indicated by TNO=1 to TNO=15 in FIG. 3(a)). As shown in FIG. 3(b), respective time required for search (11), search (12), search (13), search (14) and search (15) and (16) in the figure are 0.7 second, 0.7 second, 1.5 seconds, 0.5 second (the shortest search time), 1.1 seconds and 3.3 seconds (the longest search time). Then, the pause time of 3.3 seconds is derived.

Namely, after an elapse of 2.6 seconds from the completion of the searches (11) and (12), the automatic pause setting means releases the apparatus from the pause so that the reproducing operation of the next music program starts. Similarly, after an elapse of 1.8 seconds from the search (13), 2.8 seconds from the search (14), 2.2 seconds from the search (15), and immediately after the search (16), the reproducing operation of the next music program starts. As a result, sum of the search time and respective waiting time (pause time) becomes practically constant (a constant time interval), specifically 3.3 seconds in this example.

Next, the process of a search method in accordance with the present invention will be explained hereinbelow referring to the flow chart in FIG. 1.

A system is first to be initialized. Then, after loading a disk, reading out of TOC information recorded on the disk starts (S11).

The random reproduction key 8a (see FIG. 2) for instructing random reproduction of the music programs is next to be operated (S12). This S12 is a step for starting up the random reproduction. Then, the random selection means 9 (see FIG. 2) selects the next music program to be reproduced (S13). Here, the system is designed such that each music program is to be reproduced only once. In the random music selection means 9, one of the music programs is selected by means of, for example, a random number generator (not shown in the figure).

Next, it is judged whether the reproduction of all the music programs has been completed. If there are no music programs left to be reproduced, the sequence moves to S17 (to be described later) to terminate the random reproduction. On the other hand, if there are any music programs left to be reproduced, the sequence returns to a constant search time processing routine in S15 (details to be described later) (S14).

In S15, the searching operation is performed of the next music program to be reproduced. In addition, the time required for searching (pause time) is constant regardless of the distance between the present position of the optical pickup 1 and a starting position of the next music program to be reproduced. When the searching operation has been completed of the next music program to be reproduced in S15, the reproducing operation of the searched music program starts. Then, on completing the reproduction of the music program, it is judged whether the stop key is operated (S16).

If the stop key is operated in S16, the sequence moves to S17 to terminate the random reproduction after the reproduction of the current music program has been completed. If not, on the other hand, the sequence goes back to S13 to repeat the above-mentioned process so as to continue the reproducing operation.

Figure 4:
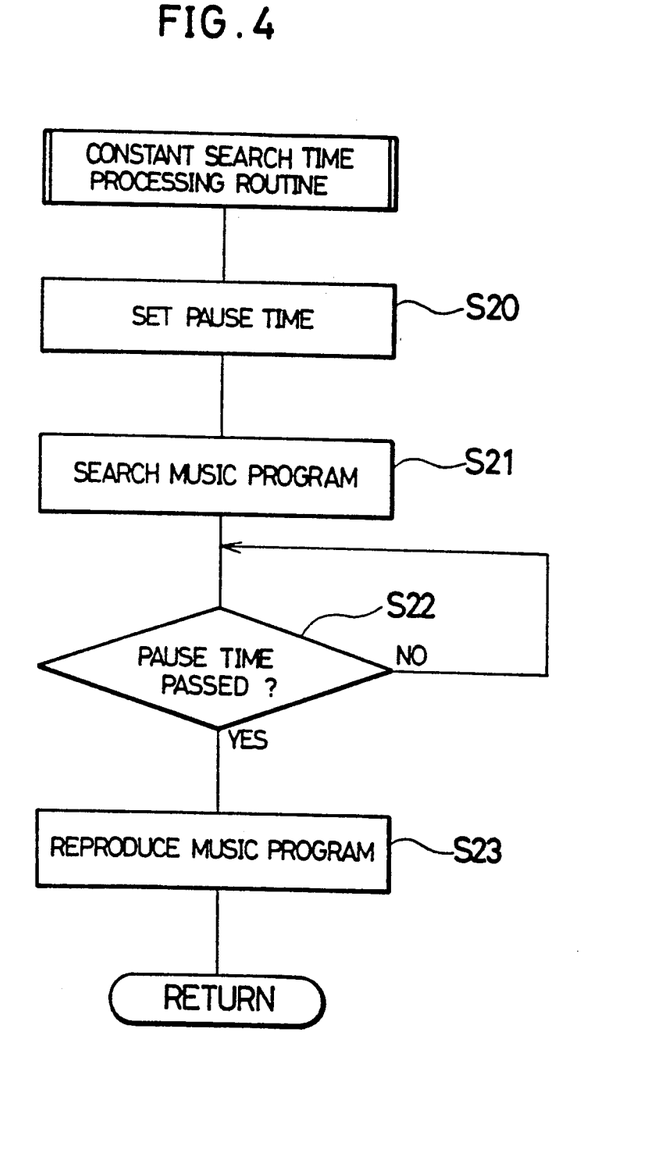
FIG. 4 is a flow chart showing a process of a constant search time processing routine in FIG. 1.

The following is a detailed description of the constant search time processing routine in S15 referring to FIG. 4.

If there are any music programs left to be reproduced in S14, the pause time is set by the pause time setting means 3b (S20). Further, the pause time is set to coincide with the longest search time so that the pause time becomes constant independently of the starting position of the next music program to be reproduced.

The search means 3c searches the next music program to be reproduced by means of the optical pickup 1 (S21). Further, the search time varies depending on the starting position of the next music program to be reproduced. (see FIGS. 3 (a) and (b)).

Next, it is judged whether the pause time has passed. If the pause time has passed, the automatic pause setting means 3a releases the apparatus form the pause. If not on the other hand, the automatic pause setting means keeps the apparatus in pause until the pause time has passed so that the sequence doe snot move on to the next step (S22). Then, the reproducing operation of the searched music program starts (S23). Thereafter, the sequence returns to the main routine.

According to he above-mentioned embodiment, since the automatic pause setting means 3a and the pause time setting means 3b are provided, the successive reproduction can be surely performed at a constant interval. Further, the designs of the optical pickup 1, the mechanism of the disk reproduction apparatus, the servo circuit, etc., do not have to be changed much. Therefore, the manufacturing cost of the apparatus will remain reasonable.

As aforementioned, a disk reproduction apparatus of the present invention, comprises: pause time setting means for setting a determined pause time; automatic pause setting means for keeping the apparatus in pause during the pause time and releasing the apparatus from the pause after the pause time has passed; and the search means for searching the next music program to be reproduced by moving an optical pickup.

With this arrangement, a time interval between an end of a current music program and a beginning of the next music program to be reproduced can be set to coincide with the pause time, independently of any recorded positions of the music programs without making a configuration of the apparatus complex. Thus, since a waiting time for each music program to be reproduced becomes constant, listeners for the disk reproduction apparatus can enjoy a natural flow of the successively reproduced music programs like when reproduction is performed of the music programs in order from an inner portion toward an outer portion of the disk. Moreover, the listeners can enjoy a disk in many ways as if music programs of other disks were being reproduced.

Another embodiment of the present embodiment will be described hereinbelow. For convenience, members having the same function as the aforementioned embodiment will be designated by the same reference numeral and their description will be omitted.

Figure 5:
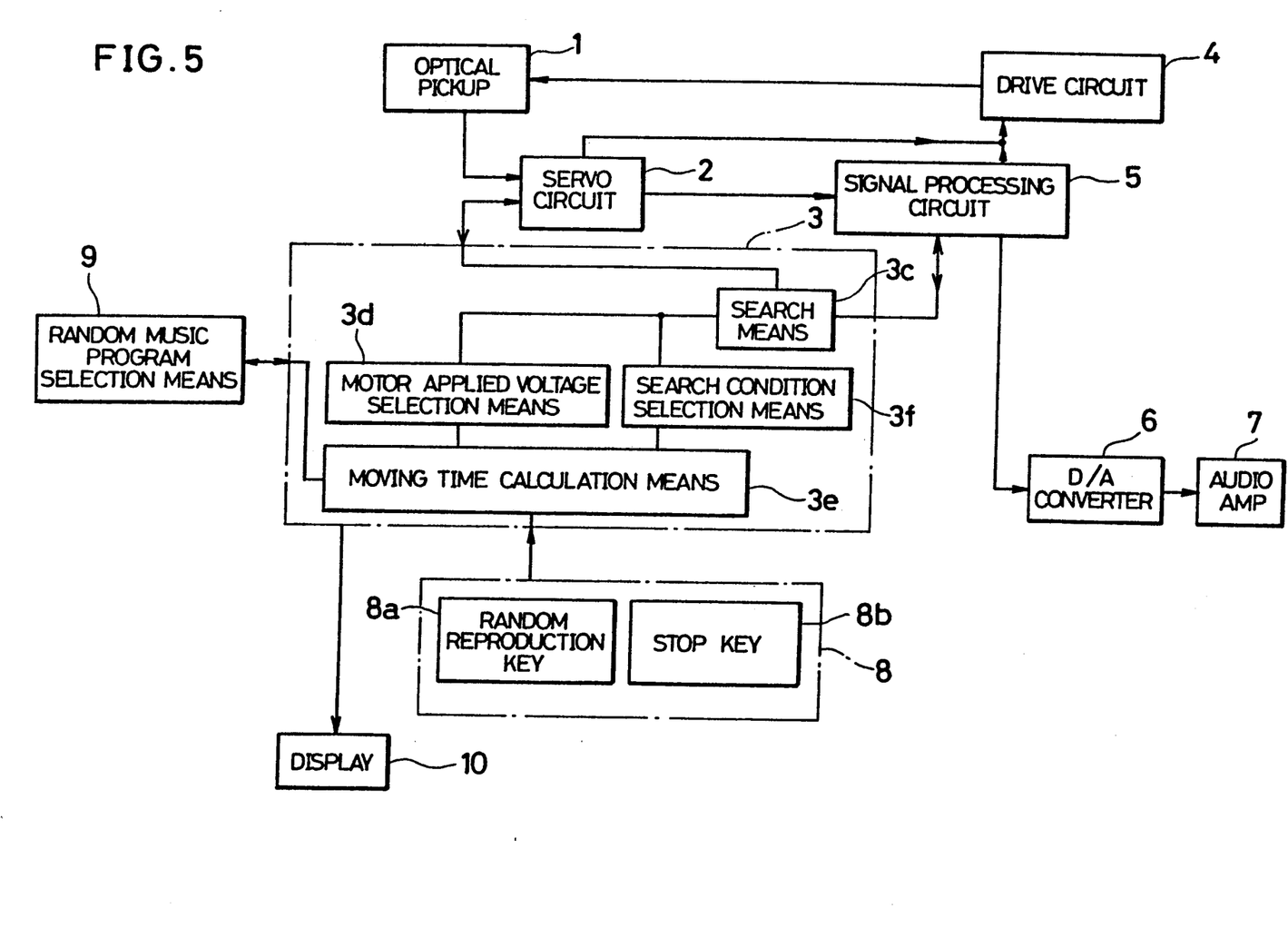
FIG. 5 is a block diagram showing an essential part of another configuration of a disk reproduction apparatus in accordance with the present invention.

As shown in FIG. 5, the difference between the first and the present embodiments lies in the fact that a microcomputer 3 (control means) includes motor applied voltage selection means 3d (applied voltage selection means), moving time calculation means 3e and search condition selection means 3f. However, other members have the same configurations as the first embodiment.

As aforementioned, for example, the search time indicated by an arrow (14) is 0.5 second (a basic search time), and the search time indicated by an arrow (16) is 3.3 seconds (another basic search time) (see FIGS. 3(a) and (b)). The moving time calculation means 3e calculates these basic search time based on the TOC information. Further, the moving time calculation means 3e releases a control signal which varies depending on the result of the calculation.

As will be described later, the search condition selection means 3f selects a search condition such that a time interval becomes substantially constant between an end of a current music program and a beginning of the next music program to be reproduced based on the output signal from the moving time calculation means 3e.

More concretely, for example, when a basic search time is relatively long, the search condition selection means 3f selects a search condition such that an access time for the optical pickup 1 can be shortened by increasing a number of tracks which the optical pickup 1 jumps at a time (hereinafter referred to as track jump). On the other hand, when the basic search time is relatively short, the search condition selection means 3f selects a search condition such that the access time for the optical pickup 1 can be extended by reducing the track jump.

The motor applied voltage selection means 3d works based on the track jump selected by the search condition selection means 3f and the control signal from the moving time calculation means 3e. Namely, when the basic search time is relatively long, a level of voltage applied to the slide motor as a drive voltage (not shown) (hereinafter referred to as drive voltage) for moving the optical pickup 1 is increased so as to increase its rotation speed. On the other hand, when the basic search time is relatively short, the level of the drive voltage is lowered so as to decrease the rotation speed of the slide motor.

The search means 3c works based on the track jump selected by the search condition selection means 3f and the output from the motor applied voltage selection means 3d. The search means 3c drives and controls the drive circuit 4 through the servo circuit 2 while confirming the signals from the signal processing circuit 5. As a result, the optical pickup 1 moves to the starting position of the next music program to be reproduced.

According to the above-mentioned arrangement, when the random reproduction key 8a is operated, the track jump is selected by the search condition selection means 3f. Thereafter, the rotation speed of the slide motor is controlled according to the drive voltage selected by the motor applied voltage selection means 3d. As a result, the time interval becomes substantially constant between the end of the current music program and the beginning of the next music program to be reproduced.

Now, a concrete example of the search condition selection means 3f will be discussed hereinbelow.

The search condition selection means 3f adjusts the track jump according to a range of the basic search time, for example, ten, thirty and a hundred with respective ranges of less than one second, one to two seconds and more than two seconds.

The following will discuss an example of the motor applied voltage selection means 3d.

The motor applied voltage selection means 3d, with the range of the basic search time less than one second, for example, may select low voltage as a drive voltage. Whereas, with the range of one to two seconds, middle voltage may be selected and with the range of more than two seconds, high voltage may be selected. These three levels, i.e., low, middle and high, of the drive voltage are respectively obtained by dividing rated voltage into the three levels.

In a concrete example, when the basic search time is 0.7 second (the search indicated by (11) or (12)) or 0.5 second (the search indicated by (14)), the track jump may be set ten, and the motor applied voltage selection means 3d selects low voltage as a drive voltage (see (11), (12), or (14) in FIG. 3(c)). As a result, the time interval becomes practically 2.3 seconds between the end of the current music program and the beginning of the next music program to be reproduced.

On the other hand, when the basic search time is 1.7 seconds (corresponding to the search indicated by (13) or (15)), the track jump may be set thirty, and the motor applied voltage selection means 3d may select middle voltage as a drive voltage (see (13) or (15) in FIG. 3(c)). As a result, the time interval becomes practically 2.3 seconds between the end of the current music program and the beginning of the next music program to be reproduced.

Further, when the basic search time is 2.7 seconds (corresponding to the search (16)), the track jump may be set a hundred, and the motor applied voltage selection means 3d may select high voltage as the drive voltage (see (16) in FIG. 3(c)). As a result, the time interval becomes practically 2.3 seconds between the end of the current music program and the beginning of the next music program to be reproduced. In addition, for convenience, the drive voltage and its time duration are indicated by hatched lines in FIG. 3(c).

As is clear from the above example, whenever the searching operation is to be performed, by selecting appropriate track jump and drive voltage, a time interval can be made substantially constant between an end of a current music program and a beginning of the next music program to be reproduced. Furthermore, a time interval between an end of the current music program and a beginning of the next music program becomes shorter than the longest search time of the conventional method.

Although the present embodiment has been discussed on one simplified example of the search condition selecting means 3f and the motor applied voltage selection means 3d, the present invention is not intended to be restricted to the specific embodiment. Namely, the relationship between the track jump and the moving speed of the optical pickup is determined by a type of a disk reproduction apparatus being employed. Further, the relationship between the drive voltage and overall moving speed of the optical pickup is determined by the type of the disk reproduction apparatus being employed as well.

Thus, it should be understood that, if moving speed and moving distance of the optical pickup are given, a search condition and a level of drive voltage, may be selected respectively by the search condition selection means and the motor applied voltage selection means so as to set the moving time constant.

Figure 6:
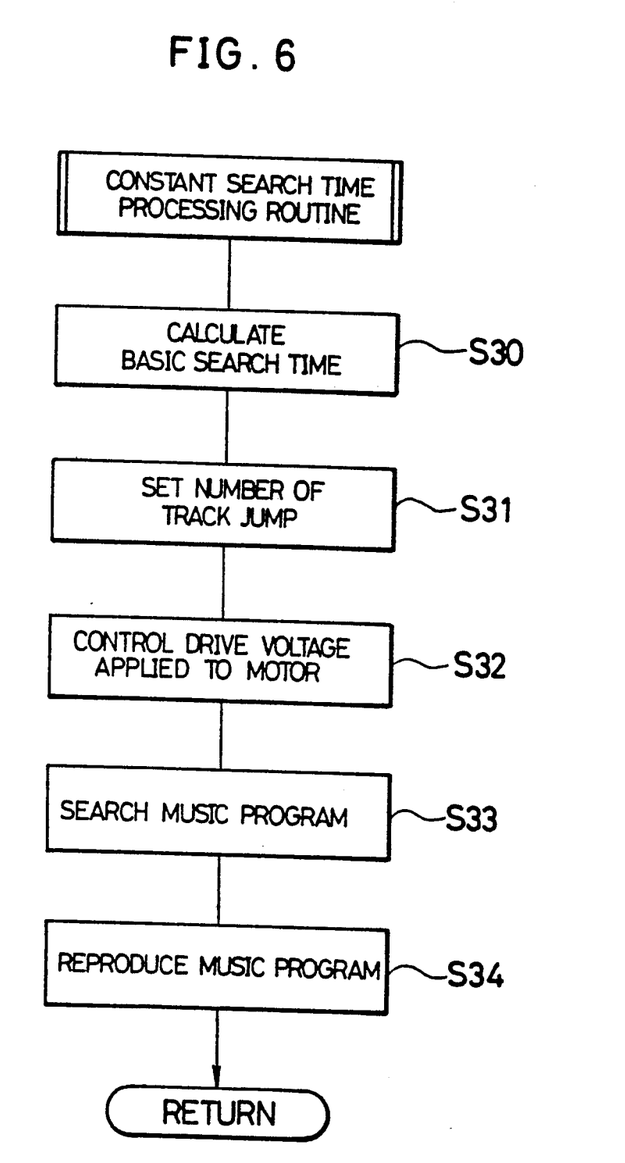
FIG. 6 is a flow chart showing another process of a constant search time processing routine in FIG. 1.

Referring to a flow chart in FIG. 6, the following will discuss a process of the search method with reference to the above-mentioned configuration.

Figure 1:
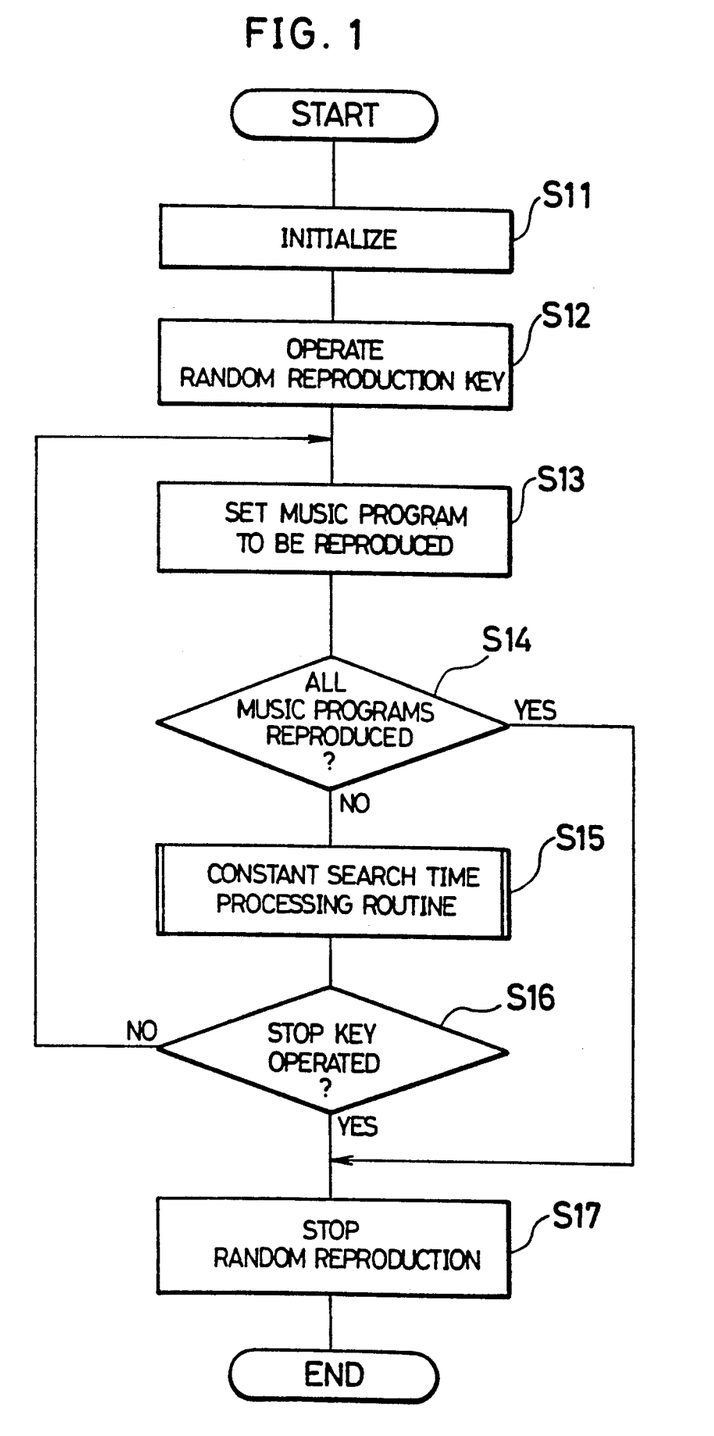
FIG. 1 is a flow chart showing a process of a search method of a disk reproduction apparatus in accordance with the present invention.

The flow chart in FIG. 6 is a part of the flow chart in FIG. 1, showing another example of the constant search time processing routine in the figure (S15).

When the random reproduction key 8a is operated in S12, the random program selection means 9 selects the next music program to be reproduced in S13. Then, in S14, the selected music program is checked whether it is the first time being reproduced. If so, the constant time interval processing routine (S15) is executed (see FIG. 1 concerning S12 through S14 in FIG. 1).

First, a basic search time is derived by the moving time calculating means 3e based on the TOC information (S30). A search condition such as the track jump is also selected based on the output form the moving time calculating means 3e (S31). Next, based on the output from the moving time calculation means 3e, the motor applied voltage selection means 3d selects the level of the drive voltage (S32). The searching operation of the next music program will be performed under the conditions of S31 and S32 (S33). Then, the reproducing operation of the searched music program is performed. Thereafter, the sequence returns to the main routine (see FIG. 1).

In the explanation of the above-mentioned embodiment, the system is designed such that each music program is to be reproduced only once. However, it should be understood that the present invention is not intended to be restricted to the specific system, and other systems such as a random reproduction system wherein the music programs can be repeatedly reproduced, or a reproduction system wherein only selected music programs are to be reproduced, etc., are equally applicable to the present invention.

Further, the present embodiment has been discussed on the random reproduction method as an example of the successive reproduction; however, the present invention is not intended to be restricted to the specific embodiment, and it is also applicable to the case where the reproducing order of a plurality of music programs is programmed beforehand so that reproduction is performed according to the order.

As aforementioned, a disk reproduction apparatus in accordance with the present invention, comprises: a drive circuit for moving the optical pickup in response to the drive voltage and/or its time duration; and control means for setting the time interval substantially constant between the end of the current music program and the beginning of the next music program to be reproduced by controlling the drive voltage and its time duration.

Since the control means controls the drive voltage to be entered to the driving circuit and its time duration, the time interval can be made substantially constant between the end of the current music program and the beginning of the next music program to be reproduced.

Thus, when performing a random reproduction of the music programs, listeners can enjoy a natural flow of the successively reproduced music programs like when reproduction is performed of the music programs in order from an inner portion toward an outer portion of the disk. Moreover, the listeners can enjoy a disk in many ways as if music programs of other disks were being reproduced.

Furthermore, a time interval between an end of the current music program and a beginning of the next music problem becomes shorter than the longest search time of the conventional method if in searching, for example, the track jump of the pickup is preferably selected.

With the search method of the disk reproduction apparatus in accordance with the present invention, when performing the successive reproduction of the music programs recorded on the disk, the search time for each music program can be made substantially constant. Thus, listeners for the disk reproduction apparatus can enjoy a natural flow cf the successively reproduced music programs like when reproduction is performed of the music programs in order from the inner portion towards the outer portion of the disk. Further, listeners can enjoy a disk in many ways as if music programs of other disks were being reproduced.

The invention being thus described, it may be obvious that the same may be varied in many ways. Such variations are not to be regarded as a departure from the scope of the invention.

There are described above novel features which the skilled man will appreciate give rise to advantages. These are each independent aspects of the invention to be covered by the present application, irrespective of whether or not they are included within the scope of the following claims.

What is claimed is:

1. A disk reproduction apparatus for successive and non-sequential reproduction of a plurality of programs recorded sequentially on a disk using an optical pickup, comprising:

drive means for moving the optical pickup from the end of a first program to the beginning of a second program in response to a first drive voltage to be applied thereto and a first time duration of said first drive voltage, and for moving the optical pickup from the end of said second program to the beginning of a third program in response to a second drive voltage to be applied to said drive means and a second time duration of sad second drive voltage;

control means for making said first and second time intervals substantially constant between an end of a program and a beginning of a succeeding non-sequential program to be reproduced by controlling said first and second drive voltages and said time durations of the drive voltages;

means for releasing a control signal which varies depending on a search time obtained through a calculation based on information recorded in a TOC area on the disk;

means for selecting a search condition based on the control signal;

applied voltage selection means for selecting said fist and second drive voltages to be applied to said drive means based on the control signal and the selected search condition; and search means for searching the next program to be reproduced by moving the optical pickup to a starting position of the next program to be reproduced according to output from the applied voltage selection means.

2. The disk reproduction apparatus as set forth in claim 1, wherein:

said search condition selection means selects a number of tracks which the optical pickup jumps at a time according to a distance between a present position of the optical pickup and a starting position of the next program to be reproduced.

* * * * *